(12) United States Patent  
Kubota

(10) Patent No.: US 9,813,685 B2  
(45) Date of Patent: *Nov. 7, 2017

(54) PROJECTION DISPLAY APPARATUS AND METHOD OF CONTROLLING THE SAME

(71) Applicant: SEIKO EPSON CORPORATION, Tokyo (JP)

(72) Inventor: Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,636

(22) Filed: Jun. 13, 2016

(65) Prior Publication Data

US 2016/0373707 A1 Dec. 22, 2016

Related U.S. Application Data

(63) Continuation of application No. 13/821,731, filed as application No. PCT/JP2011/005115 on Sep. 12, 2011, now Pat. No. 9,386,259.

(30) Foreign Application Priority Data

Sep. 15, 2010 (JP) .................................. 2010-206411

(51) Int. Cl.  
*G03B 21/00* (2006.01)  
*H04N 9/31* (2006.01)  
(Continued)

(52) U.S. Cl.  
CPC ....... *H04N 9/3185* (2013.01); *G06F 3/04847* (2013.01); *H04N 5/74* (2013.01); *H04N 9/3194* (2013.01)

(58) Field of Classification Search  
CPC ....... G03B 21/00; G06T 5/006; H04N 9/3197  
(Continued)

(56) References Cited

U.S. PATENT DOCUMENTS 7,093,942 B2   8/2006  Salvatori et al.  
9,386,259 B2 *  7/2016  Kubota ............... G06F 3/04847  
(Continued)

FOREIGN PATENT DOCUMENTS

JP   2003-009038 A   1/2003  
JP   2010-098728 A   4/2010

OTHER PUBLICATIONS

May 9, 2012 Search Report issued in International Patent Application No. PCT/JP2011/005115.  
(Continued)

*Primary Examiner* — Steven H Whitesell Gordon  
*Assistant Examiner* — Jerry Brooks  
(74) *Attorney, Agent, or Firm* — Oliff PLC

(57) ABSTRACT

A projection display apparatus includes an image projecting unit projecting an image, an operation unit as an operation device whose output value changes depending on the amount of operation, a correction amount setting unit changing a keystone correction amount in accordance with an output value of the operation unit, and a keystone correcting unit performing keystone correction on an image to be projected in accordance with the keystone correction amount. A zero reference position in which the keystone correction amount is zero is set in an operation range of the operation unit. The correction amount setting unit sets a dead zone in the operation range such that the dead zone includes the zero reference position and an area surrounding this position, and sets the keystone correction amount to zero in accordance with the output value corresponding to the inside of the dead zone.

7 Claims, 7 Drawing Sheets

(51) Int. Cl.
*G06F 3/0484* (2013.01)
*H04N 5/74* (2006.01)

(58) Field of Classification Search
USPC .................................. 353/69, 70; 348/190
See application file for complete search history.

(56) References Cited

U.S. PATENT DOCUMENTS

| | | |
|---|---|---|
| 2002/0060754 A1 | 5/2002 | Takeuchi |
| 2004/0036844 A1 | 2/2004 | Wood et al. |
| 2004/0041985 A1 | 3/2004 | Kimura et al. |
| 2005/0270502 A1 | 12/2005 | Iinuma |
| 2008/0079907 A1 | 4/2008 | Takatsu et al. |
| 2009/0238490 A1 | 9/2009 | Tamura |
| 2010/0100359 A1 | 4/2010 | Podoloff et al. |

OTHER PUBLICATIONS

May 9, 2012 Written Opinion issued in International Patent Application No. PCT/JP2011/005115.
Mar. 15, 2016 Notice of Allowance issued in U.S. Appl. No. 13/821,731.
Sep. 2, 2015 Office Action issued in U.S. Appl. No. 13/821,731.
Apr. 24, 2015 Office Action issued in U.S. Appl. No. 13/821,731.
Sep. 19, 2014 Office Action issued in U.S. Appl. No. 13/821,731.

\* cited by examiner

[Fig. 1]
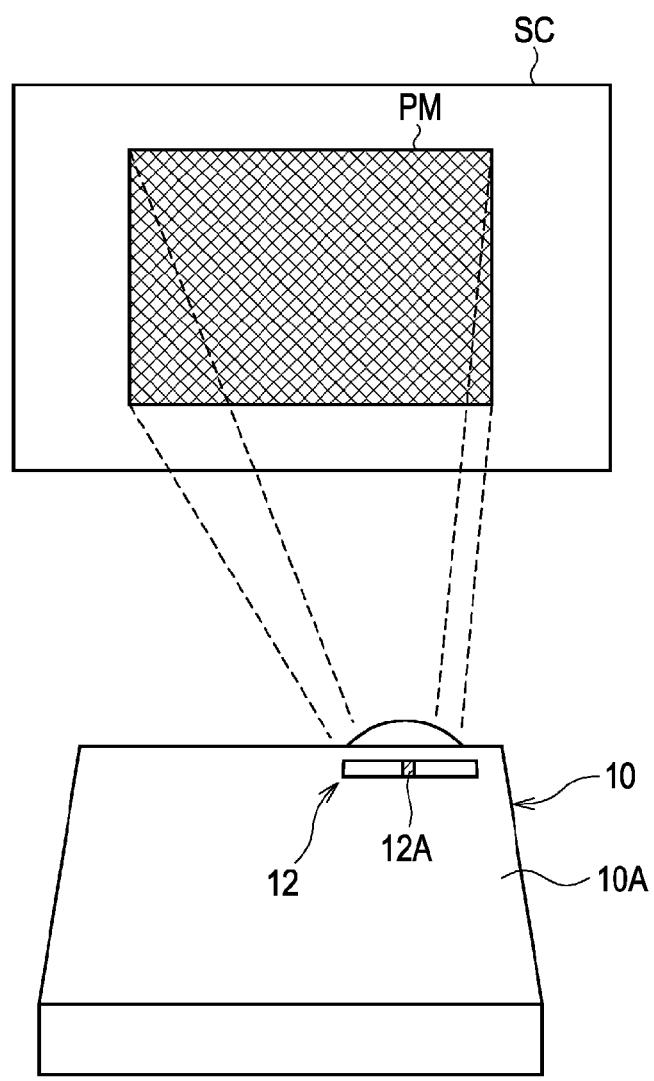

[Fig. 2A]
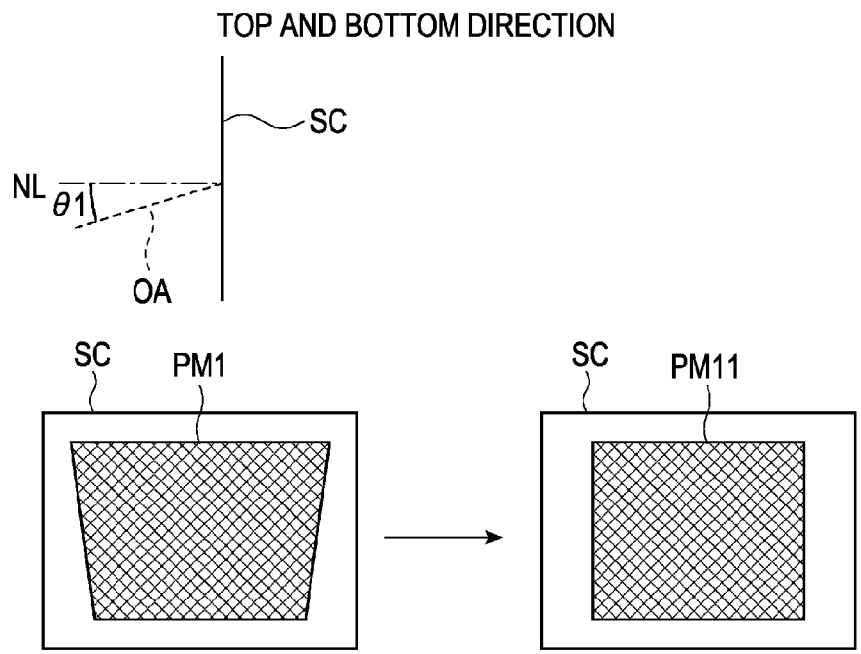
[Fig. 2B]
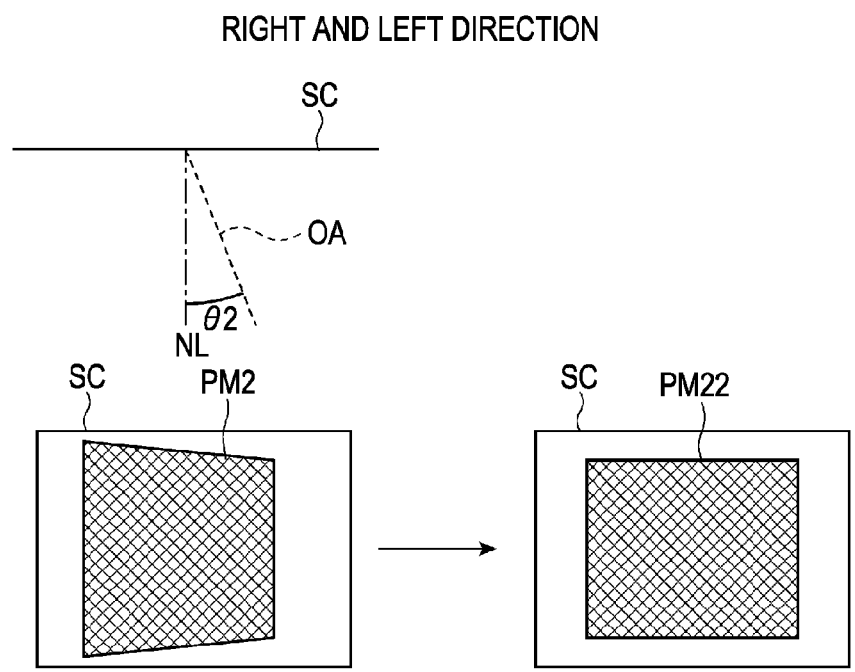

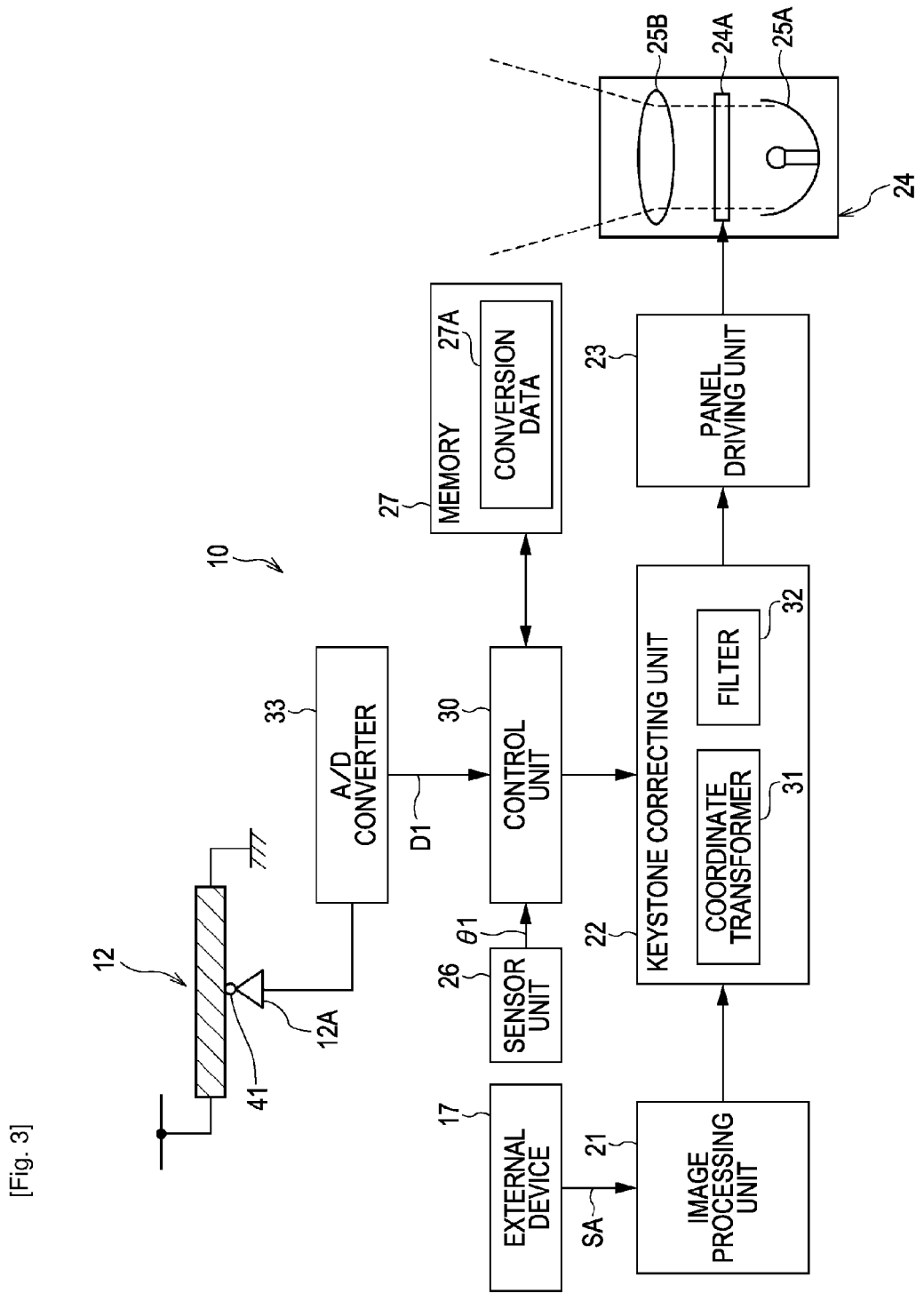
[Fig. 3]

[Fig. 4]
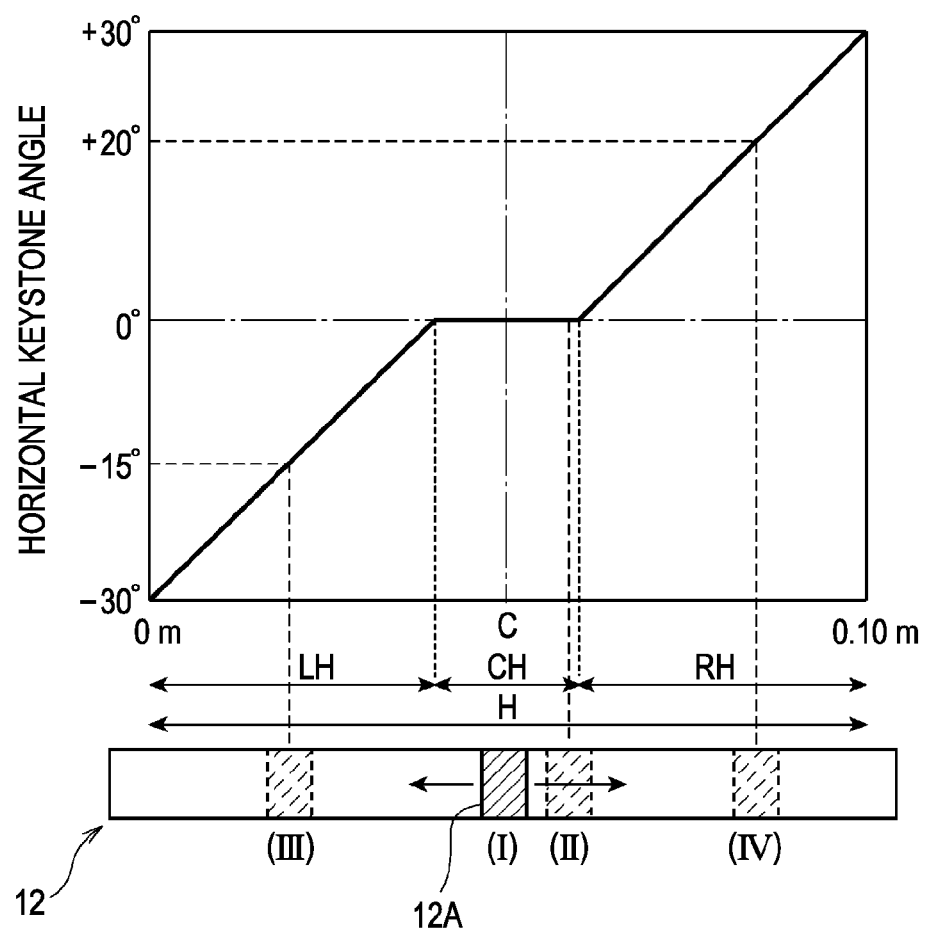

[Fig. 5]
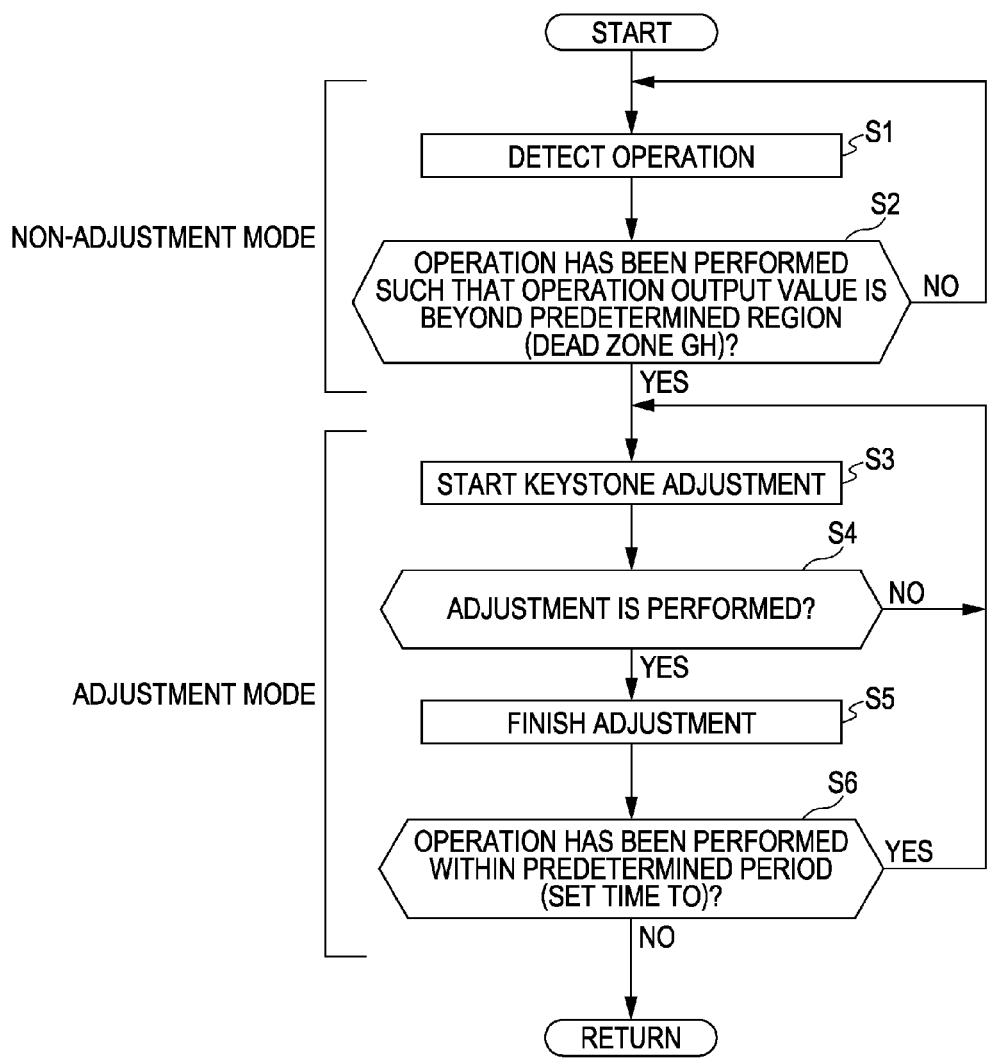

[Fig. 6A]
NON-ADJUSTMENT MODE
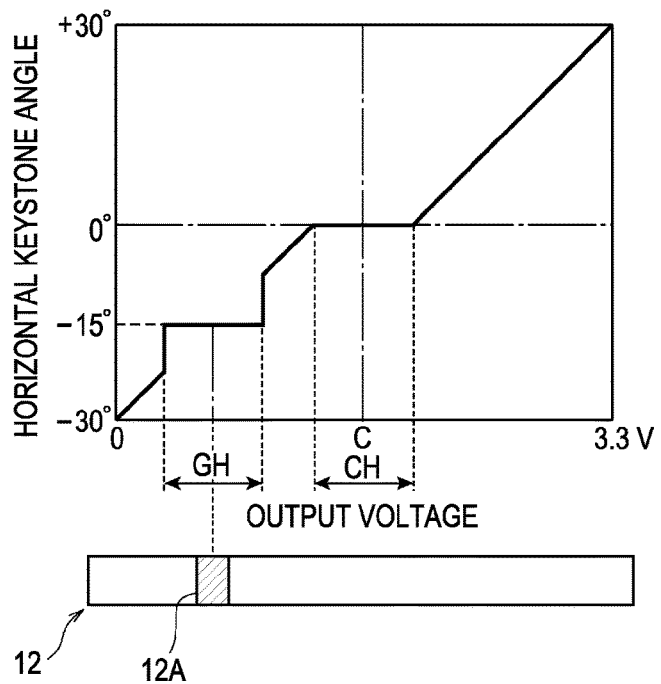
[Fig. 6B]
ADJUSTMENT MODE
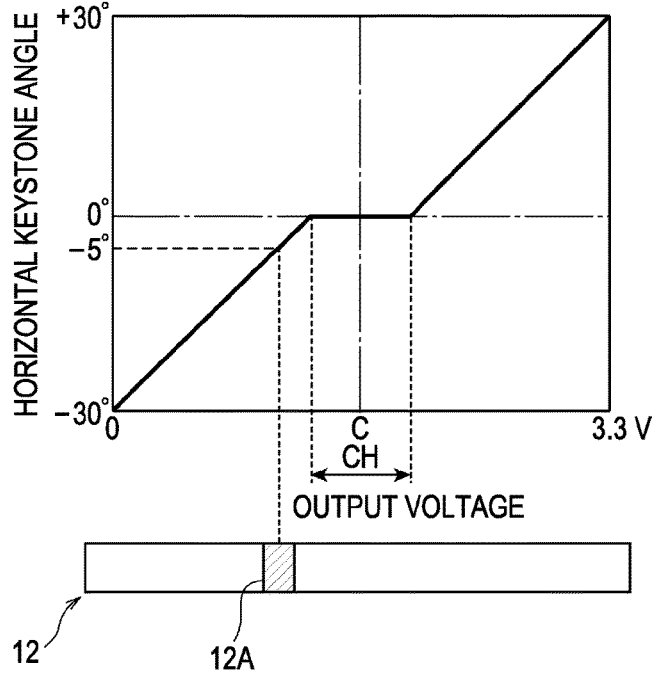

[Fig. 7]
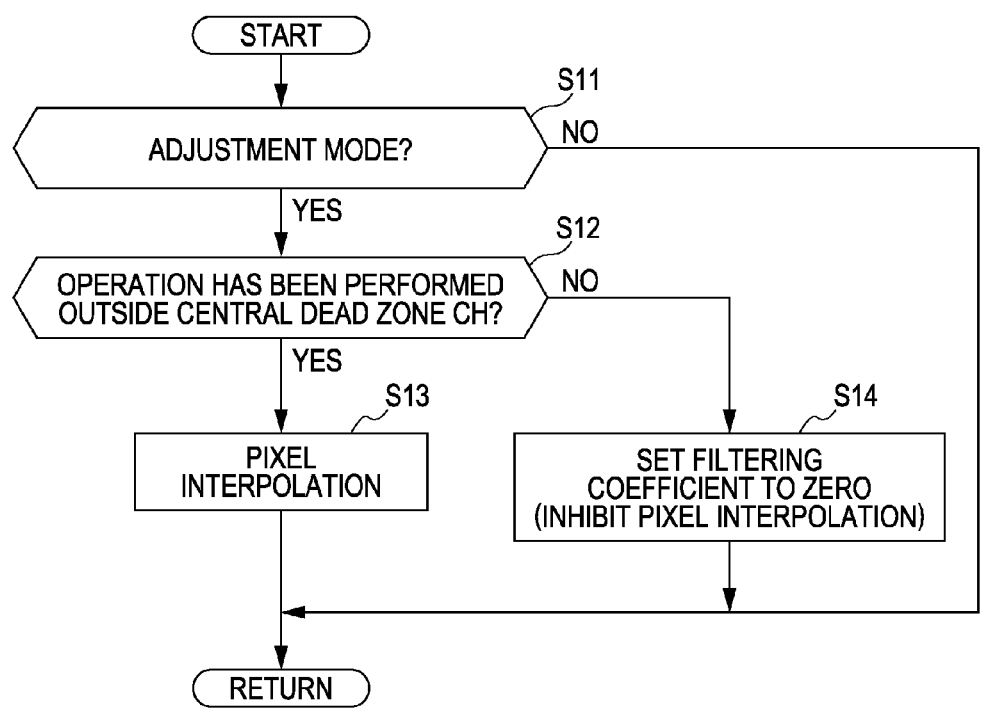

PROJECTION DISPLAY APPARATUS AND METHOD OF CONTROLLING THE SAME

CROSS REFERENCES TO RELATED APPLICATIONS

This application is a Continuation of U.S. patent application Ser. No. 13/821,731, filed Mar. 8, 2013, which is a National Stage Entry of PCT/JP2011/005115, filed Sep. 12, 2011, which claims the priority of Japanese Patent Application No. 2010-206411, filed Sep. 15, 2010. All of the above applications are expressly incorporated by reference herein.

TECHNICAL FIELD

The present invention relates to a projection display apparatus capable of performing keystone correction and a method of controlling the same.

BACKGROUND ART

Some projection display apparatuses (projectors) have a function for keystone correction (trapezoidal distortion correction). The keystone correction includes vertical keystone correction, as correction in the top and bottom direction, and horizontal keystone correction, as correction in the right and left direction. The projection display apparatuses having the keystone correction function include a manual type which is provided with two discrete rotary knobs to adjust the amount of vertical keystone correction and the amount of horizontal keystone correction in accordance with rotations of the rotary knobs (refer to PTL 1, for example).

CITATION LIST

Patent Literature

[PTL 1]
JP-A-2003-9038

SUMMARY OF INVENTION

Technical Problem

When the projection display apparatus is accurately disposed so as to face a projection screen, horizontal keystone correction is not needed. In this case, a user operates the rotary knob such that the amount of horizontal keystone correction (hereinafter, "horizontal keystone correction amount") is zero. Practically, however, it is difficult to operate an analog operation device, such as a rotary knob, to a single operation position where the amount of keystone correction (hereinafter, "keystone correction amount") is zero. If the user has intended to operate the rotary knob to such a zero position, the knob may be actually deviated from the position slightly.

If the display apparatus is provided with a click mechanism to generate a mechanical click state (a click and sense of clicking) at the zero position where the keystone correction amount is zero, it is just conceivable that the user may actually operate the rotary knob to a position slightly deviated from the zero position though the user has intended to operate the knob to the zero position. Simply adding the click mechanism does not solve the difficulty of controlling the amount of correction to zero.

If such an operation device includes a variable resistor, serving as a relatively inexpensive part, such that the keystone correction amount is set by a voltage value changed through the variable resistor, individual variations between variable resistors result in variations in voltage value. Each variable resistor therefore needs calibration. Furthermore, a voltage value set by the variable resistor varies depending on, for example, variation in power supply voltage or temperature drift. In the use of the variable resistor, therefore, it is more difficult to set a keystone correction amount to zero.

If the display apparatus is configured such that the current keystone correction amount is indicated in a projected image, the user can easily control the keystone correction amount to zero. Indication processing is, however, required separately. Furthermore, since such an indication overlaps part of the image which the user is viewing, it hinders the viewing.

The present invention has been made in consideration of the above-described circumstances. The present invention provides a projection display apparatus in which a user can easily adjust the keystone correction amount to zero without relying on an indication, and a method of controlling the same.

Solution to Problem

An aspect of the present invention provides a projection display apparatus including an image projecting unit that projects an image, an operation unit whose output value changes depending on the amount of operation, a correction amount setting unit that changes a keystone correction amount in accordance with an output value of the operation unit, and a keystone correcting unit that performs keystone correction on an image to be projected in accordance with the keystone correction amount, wherein a zero reference position in which the keystone correction amount is zero is set within an operation range of the operation unit, a dead zone, which includes the zero reference position and an area surrounding the zero reference position, is set within the operation range of the operation unit, and the correction amount setting unit sets the keystone correction amount to zero in accordance with the output value corresponding to the inside of the dead zone.

With this configuration, the dead zone including the zero reference position of the operation unit and the area surrounding the zero reference position is set within the operation range of the operation unit and the keystone correction amount is set to zero in accordance with the output value, corresponding to the inside of the dead zone, of the operation unit. Accordingly, the user can easily set the keystone correction amount to zero without relying on an indication of the keystone correction amount.

In this aspect of the present invention, the keystone correction amount may be easily set to zero using an inexpensive variable resistor. Advantageously, the user can adjust the keystone correction amount instinctively.

In this aspect of the present invention, the keystone correction amount may be easily set to zero while information regarding the keystone correction amount is not provided to the user.

In this aspect of the present invention, if the operation unit is operated within the dead zone, pixel interpolation may be inhibited. Advantageously, an input image can be displayed faithfully, thus improving image quality.

In this aspect of the present invention, the operation unit may reliably provide a click state within the dead zone.

Accordingly, the user can easily and reliably set the keystone correction amount to zero without relying on vision. In this case, the operation unit may provide the click state at the zero reference position. With this configuration, the keystone correction amount can be more easily and reliably set to zero.

Another aspect of the present invention provides a method of controlling a projection display apparatus that projects an image, the apparatus including an operation unit whose output value changes depending on the amount of operation, the method including changing a keystone correction amount in accordance with an output value of the operation unit, performing keystone correction on an image to be projected in accordance with the keystone correction amount, setting a zero reference position, in which the keystone correction amount is zero, within an operation range of the operation unit, setting a dead zone within the operation range of the operation unit such that the dead zone includes the zero reference position and an area surrounding the zero reference position, and setting the keystone correction amount to zero in accordance with the output value corresponding to the inside of the dead zone.

With this configuration, the dead zone including the zero reference position of the operation unit and the area surrounding the zero reference position is set within the operation range of the operation unit and the keystone correction amount is set to zero in accordance with the output value, corresponding to the inside of the dead zone, of the operation unit. Accordingly, the user can easily set the keystone correction amount to zero without relying on an indication of the keystone correction amount.

Advantageous Effects of Invention

Another aspect of the present invention provides a projection display apparatus including an image projecting unit that projects an image, an operation unit, whose output value changes depending on the amount of operation, that is a sliding operation device capable of being operated in a direction orthogonal to a projection direction in which the image is projected by the image projecting unit, a correction amount setting unit that sets a keystone correction amount in the direction orthogonal to the projection direction, and changes the keystone correction amount in accordance with an output value of the operation unit; and a keystone correcting unit that performs keystone correction on an image to be projected in accordance with the keystone correction amount.

With this configuration, the user can adjust the keystone correction amount instinctively.

According to the present invention, the user can easily set the keystone correction amount without relying on an indication of the keystone correction amount.

BRIEF DESCRIPTION OF DRAWINGS

FIG. 1 is a diagram illustrating a projector according to an embodiment of the present invention.

FIG. 2A is a diagram explaining a case where the projector is tilted in the top and bottom direction.

FIG. 2B is a diagram explaining a case where the projector is tilted in the right and left direction.

FIG. 3 is a block diagram of the functional configuration of the projector.

FIG. 4 is a graph illustrating of the relationship between a keystone operation unit and a horizontal keystone correction amount.

FIG. 5 is a flowchart of an operation mode switching process.

FIG. 6A is a diagram explaining a non-adjustment mode.

FIG. 6B is a diagram explaining an adjustment mode.

FIG. 7 is a flowchart of control by a filter.

DESCRIPTION OF EMBODIMENT

An embodiment of the present invention will be described below with reference to the drawings.

FIG. 1 illustrates a projector (projection display apparatus) 10 according to an embodiment of the present invention. The projector 10 projects image light representing an image to display an image (projected image) PM on a screen SC, serving as a projection plane. The projector 10 has a keystone correction (trapezoidal distortion correction) function of correcting a trapezoidal distortion of the projected image PM caused by the relative positional relationship between the projector 10 and the screen SC. The projected image PM may be either of a still image and a moving image.

FIG. 2A is a diagram explaining a case where the projector 10 is tilted in the top and bottom direction (also referred to as "the vertical direction" or "the longitudinal direction"). Referring to FIG. 2A, the optical axis OA of projected light is tilted in the top and bottom direction relative to a normal NL of the screen SC by a tilt angle theta1 (hereinafter, referred to as a "vertical tilt angle theta1). If keystone correction is not performed, a trapezoidally distorted projected image PM1 is displayed such that the length of the upper side of the image differs from that of the lower side as illustrated in left part of FIG. 2A. Right part of FIG. 2A illustrates a projected image PM11 subjected to keystone correction in the top and bottom direction (vertical keystone correction) for the vertical tilt angle theta1.

FIG. 2B is a diagram explaining a case where the projector 10 is tilted in the right and left direction (also referred to as "the horizontal direction" or "the lateral direction"). Referring to FIG. 2B, the optical axis OA of projected light is tilted in the right and left direction relative to the normal NL of the screen SC by a tilt angle theta2 (hereinafter, referred to as the "horizontal tilt angle theta2"). If keystone correction is not performed, a trapezoidally distorted projected image PM2 is displayed such that the length of the left side of the image differs from that of the right side as illustrated in left part of FIG. 2B. Right part of FIG. 2B illustrates a projected image PM22 subjected to keystone correction in the right and left direction (horizontal keystone correction) for the horizontal tilt angle theta2.

Referring to FIG. 1, a housing 10A of the projector 10 is provided with a keystone operation unit 12 disposed on the upper surface thereof such that the keystone operation unit 12 can be operated in the right and left direction (direction orthogonal to a projection direction). The keystone operation unit 12 functions as a manual operation device for horizontal keystone correction. The keystone operation unit 12 includes an operation member 12A, which includes a sliding variable resistor and which the user can slide horizontally while holding with fingers. When the operation member 12A is operated from one side to the other side in a sliding range, an output voltage changes in proportion to the amount of operation (slide stroke) of the operation member 12A.

A constant power supply voltage V1 (3.3 V in the present configuration) is applied to the keystone operation unit 12. An output voltage changes depending on the position of the operation member 12A of the keystone operation unit 12. In the present configuration, a horizontal keystone correction amount is set on the basis of the output voltage. Consequently, the horizontal keystone correction amount is set by a user's manual operation.

In the present configuration, an operation direction for adjustment of the horizontal keystone correction amount is allowed to coincide with the right and left direction in which the optical axis OA is tilted and horizontal keystone correction has to be performed. Accordingly, the user can intuitively adjust the horizontal keystone correction amount and also instinctively recognize the keystone operation unit 12 as an operation unit for horizontal keystone correction amount.

FIG. 3 is a block diagram illustrating the functional configuration of the projector 10. Referring to FIG. 3, the projector 10 includes an image processing unit 21, a keystone correcting unit (trapezoidal distortion correcting unit) 22, a panel driving unit 23, an image projecting unit 24 including a liquid crystal display panel 24A, a sensor unit 26, a memory 27, and a control unit 30.

The image processing unit 21 receives an image signal SA from an external device 17, such as a personal computer or a DVD player, connected thereto via a cable. The image processing unit 21 writes image data corresponding to the signal SA to a frame buffer (not illustrated) on a frame-by-frame basis, and performs IP conversion to convert the image data from the interlace format to the progressive format, resolution conversion to enlarge or reduce the size of the IP-converted image data, and various color corrections to control, for example, brightness and color saturation. The frame buffer stores original image data output from the image processing unit 21, uncorrected image data obtained by format-converting the original image data through the image processing unit 21, and corrected image data obtained by performing keystone correction on the uncorrected image data through the keystone correcting unit 22.

The keystone correcting unit 22 corrects a trapezoidal distortion caused when an image is projected while the projection axis (corresponding to the optical axis OA of projected light) of the projector 10 is tilted relative to the screen SC, namely, performs vertical keystone correction and horizontal keystone correction. The keystone correcting unit 22 includes a coordinate transformer 31 that performs transformation of the coordinates for horizontal and/or vertical keystone correction and a filter (pixel interpolator) 32 that performs pixel interpolation associated with keystone correction.

To perform keystone correction, an image is displayed on the liquid crystal display panel 24A such that the trapezoidal distortion is compensated for. When keystone correction is typically performed in the projector including the liquid crystal display panel, the liquid crystal display panel 24A displays an image smaller than an original image to be subjected to trapezoidal distortion correction. Fundamentally, the original image is reduced. If the original image is angled significantly, part of the image may be enlarged.

For reduction of the original image, simply thinning image data results in a jagged image. The filter 32 performs pixel interpolation to avoid jagged distortions. The filter 32 performs pixel interpolation on the basis of a filtering coefficient associated with keystone correction. The coordinate transformer 31 and the filter 32 may include a variety of known components.

The panel driving unit 23 drives the liquid crystal display panel 24A of the image projecting unit 24. The panel driving unit 23 drives the liquid crystal display panel 24A on the basis of corrected image data subjected to image processing (including keystone correction) to display an image.

The image projecting unit 24 includes a light source device 25A functioning as a light source, the liquid crystal display panel (also termed a liquid crystal light valve) 24A, and a projection lens 25B. The liquid crystal display panel 24A includes a transmissive liquid crystal display panel including a plurality of pixels arranged in a matrix. The liquid crystal display panel 24A is driven by the panel driving unit 23 such that the transmittance ratio of each pixel is changed to modulate illumination light from the light source to image light representing an image.

When the projector 10 is a 3-chip LCD projector, three liquid crystal display panels 24A for the three colors of red, green, and blue or RGB and mirrors and a prism for splitting light from the light source device 25A and combining light are arranged. In the present embodiment, the apparatus includes a single liquid crystal display panel 24A for the convenience of description.

The projection lens 25B enlarges and projects image light modulated by the liquid crystal display panel 24A. An optical system of the image projecting unit 24 may include a lens array for adjusting light distribution, a polarization adjusting element, a mirror, a dustproof glass, and the like. The image projecting unit 24 may include a variety of known components.

The sensor unit 26 functions as an angle detecting unit that detects a tilt angle in the top and bottom direction (the vertical direction or the longitudinal direction) of the projector 10, namely, the vertical tilt angle theta1 illustrated in FIG. 2A. The sensor unit 26 includes a G-sensor (accelerometer) detecting the inclination of the projector 10 with respect to the vertical direction, detects the vertical tilt angle theta1 using the G-sensor, and transmits data indicating the detected vertical tilt angle theta1 to the control unit 30.

The memory 27 stores various programs, such as a control program, and various data items. The memory 27 further stores conversion data 27A, which will be described later.

The control unit 30 reads the control program stored in the memory 27 and executes the program, thus functioning as a computer for controlling the components of the projector 10.

Referring to FIG. 3, the projector 10 includes an analog-to-digital (A/D) converter 33 that converts an output voltage, which is in analog form, of the keystone operation unit 12 into digital form. A digital value indicating the output voltage is transmitted as an operation output value D1 from the A/D converter 33 to the control unit 30. The control unit 30 functions as a correction amount setting unit that sets a keystone correction amount on the basis of the operation output value D1.

In this case, the control unit 30 allows the keystone correcting unit 22 to perform an automatic keystone correction process of automatically performing vertical keystone correction on the basis of the vertical tilt angle theta1 detected by the sensor unit 26 and a manual keystone correction process of performing horizontal keystone correction on the basis of the operation output value D1 associated with the keystone operation unit 12.

The projector 10 is configured such that information regarding a keystone correction amount (for example, the current value of the keystone correction amount) is not provided to the user, so that the user directs the projector 10 through the sliding keystone operation unit 12 to perform horizontal keystone correction without relying on an indication. More specifically, the user operates the operation member 12A of the keystone operation unit 12 from side to side within an operation range to set a horizontal keystone correction amount in the range of −30 degrees to +30 degrees (one of the right and left ends is set to the minus end and the other end is set to the plus end).

In this case, an equal assignment method may be used which sets a point at the middle of the operation range to a zero position where the horizontal keystone correction amount is zero, assigns a correction amount of −30 degrees to one end of the operation range, assigns a correction amount of +30 degrees to the other end, and equally assigns correction amounts for horizontal keystone angles excluding −30 degrees, 0 degree, and +30 degrees, to operation positions between these ends.

According to this equal assignment method, however, it is difficult for the user to operate the operation member 12A to the single middle position where the keystone correction amount is zero. If the user has intended to operate the operation member 12A to the zero position, the operation member 12A may be deviated from the zero position. Such an event will be called a first event alpha where the operation member 12A is deviated from the zero position despite the user's intention.

For example, when the user accurately places the projector 10 such that the horizontal tilt of the optical axis OA is zero, the user intends to operate the operation member 12A to the zero position such that horizontal keystone correction is not performed but the operation member 12A is slightly deviated from the zero position. In this case, horizontal keystone correction is performed unnecessarily. It is therefore preferable to avoid the first event alpha.

In addition, individual variations of the variable resistor in the keystone operation unit 12, variation in the power supply voltage V1, temperature drift, and noise are factors causing the first event alpha.

If the operation position of the operation member 12A of the keystone operation unit 12 is not changed, the operation output value D1 may vary due to variation in the power supply voltage V1 applied to the keystone operation unit 12, temperature drift, and/or noise. In this case, an event in which the horizontal keystone correction amount is changed despite the user's intention is caused. This event will be called a second event beta where the horizontal keystone correction amount is changed due to a factor other than operation. It is preferable to avoid the second event beta.

The projector 10 with the present configuration has the following countermeasures against the first event alpha and the second event beta.

[Countermeasure Against First Event Alpha]

According to this countermeasure, as illustrated in FIG. 4, the middle position in the operation range, indicated at H, is set to a zero reference position C where the horizontal keystone correction amount is zero, and a continuous region CH (hereinafter, "central dead zone") including the zero reference position C and an area surrounding the zero reference position C is set to a zone where the horizontal keystone correction amount is zero.

Specifically, the operation range H of the keystone operation unit 12 in this countermeasure is 0.1 m as illustrated in FIG. 4. An area extending from the zero reference position C, which corresponds to the middle position at a distance of 0.05 m from each end, to each side by a distance of 0.01 m is the central dead zone CH. Accordingly, if the operation member 12A is positioned within the central dead zone CH, the horizontal keystone correction amount is set to zero (corresponding to a horizontal keystone angle of 0 degree). For example, when the operation member 12A is in a position indicated at (I) or (II) in FIG. 4, the horizontal keystone correction amount is set to zero.

A region (left operation region LH in FIG. 4) between one end (left end) of the central dead zone CH and one end (left end) of the operation range H is allocated for adjustment of horizontal keystone correction amounts of 0 to −30 degrees (up to a maximum horizontal keystone angle on the one end).

In this region LH, as the operation member 12A moves to the one end, the horizontal keystone correction amount continuously decreases. In this countermeasure, the horizontal keystone correction amount decreases in proportion to the movement of the operation member 12A toward the one end in the region LH. For example, if the operation member 12A is in a position (III) in FIG. 4, the horizontal keystone correction amount is set to a correction amount of −15 degrees.

A region (right operation region RH in FIG. 4) between the other end (right end) of the central dead zone CH and the other end (right end) of the operation range H is allocated for adjustment of horizontal keystone correction amounts of 0 to +30 degrees (up to a maximum horizontal keystone angle on the other end).

In this region RH, as the operation member 12A moves to the other end, the horizontal keystone correction amount continuously increases. In this countermeasure, the horizontal keystone correction amount increases in proportion to the movement of the operation member 12A to the other end in the region RH. For example, if the operation member 12A is in a position (IV) in FIG. 4, the horizontal keystone correction amount is set to a correction amount of +20 degrees.

The above-described allocation is achieved by previously storing the conversion data 27A (refer to FIG. 3) in table form, indicating the relationship between the operation output value D1 of the keystone operation unit 12 and the horizontal keystone correction amount, to the memory 27. More specifically, the control unit 30 refers to the conversion data 27A to determine a horizontal keystone correction amount corresponding to the current operation output value D1, and controls the keystone correcting unit 22. The conversion data 27A is not limited to data in table form. The conversion data 27A may be information (conversion data) indicating a relational expression indicating the relationship in FIG. 4.

Consequently, if the user operates the operation member 12A such that the operation member 12A enters the central dead zone CH, the horizontal keystone correction amount can be set to zero. As compared with a configuration in which the horizontal keystone correction amount is set to zero at only the zero reference position C, the horizontal keystone correction amount can be easily and reliably set to zero.

In this configuration, the operation direction for adjustment of the horizontal keystone correction amount coincides with the right and left direction, serving as the direction in which the optical axis OA is tilted and horizontal keystone correction has to be performed. Accordingly, the user can intuitively adjust the horizontal keystone correction amount.

Furthermore, according to this countermeasure, the projector 10 is provided with a click mechanism 41, schematically illustrated in FIG. 3, which allows the keystone operation unit 12 to provide a mechanical click state when the operation member 12A of the keystone operation unit 12 is operated to the zero reference position C. The click mechanism 41 is a mechanism which generates, for example, a sense of clicking and a click using a spring material and a latching mechanism such that the user can recognize a clicked position tactually and aurally. The click mechanism 41 may include a known mechanism.

Since this kind of click mechanism 41 is a mechanical component, a position where the sense of clicking is generated varies depending on the influence of an error, change over time, or the like.

In this configuration, in the use of the click mechanism 41, the keystone operation unit 12 provides the click state at least in the vicinity of the zero reference position C. In other words, the keystone operation unit 12 reliably provides the click state within the central dead zone CH. Accordingly, the user can reliably operate the operation member 12A of the keystone operation unit 12 to the vicinity of the zero reference position C, namely, into the central dead zone CH without relying on vision. The user can therefore easily and reliably set the horizontal keystone correction amount to zero while viewing an image projected by the projector 10 in a dark room.

The central dead zone CH is allocated to an area of 20% of the operation range H. If individual variations of the variable resistor in the keystone operation unit 12, variation in the power supply voltage V1, temperature drift, or noise occurs while the operation member 12A of the keystone operation unit 12 is operated to the vicinity of the zero reference position C, therefore, a variation in the operation output value D1 is not beyond a voltage range, initially set, corresponding to the central dead zone CH.

Accordingly, if individual variations of the variable resistor in the keystone operation unit 12, variation in the power supply voltage, temperature drift, or noise occurs, the horizontal keystone correction amount can be held at zero.

The central dead zone CH is not limited to 20% of the operation range H. The central dead zone CH may be below or above 20% of the operation range H such that a variation in the operation output value D1 is not beyond the initial set range even when individual variations of the variable resistor, variation in the power supply voltage V1, temperature drift, or noise occurs. As described above, the countermeasure against the first event alpha is provided.

[Countermeasure Against Second Event Beta]

According to this countermeasure, the projector 10 has, as operation modes, an adjustment mode in which the keystone correction amount is changed in accordance with an operation of the keystone operation unit 12, i.e., the operation output value D1 as described above and a non-adjustment mode in which the keystone correction amount is fixed without depending on an operation of the keystone operation unit 12, i.e., the operation output value D1. The control unit 30 performs an operation mode switching process.

FIG. 5 is a flowchart illustrating the operation mode switching process. FIGS. 6A and 6B are diagrams explaining operations in these modes. The operation mode switching process is repeated during turn-on of the projector 10. The operation mode switching process may be stopped in accordance with setting by the user.

As a precondition of the operation mode switching process, while the keystone operation unit 12 is not operated for predetermined set time (two seconds in this countermeasure) TO, namely, while the operation output value D1 of the keystone operation unit 12 is not changed for the set time TO or more, the operation mode is switched to the non-adjustment mode. Accordingly, if a state where the user does not operate the keystone operation unit 12 continues, the operation mode is switched to the non-adjustment mode. An operation in the non-adjustment mode will be described below.

In the non-adjustment mode, the control unit 30 fixes the keystone correction amount. In FIG. 6A, the horizontal keystone correction amount is fixed to −15 degrees.

Referring to FIG. 5, in the non-adjustment mode, the control unit 30 detects an operation of the keystone operation unit 12 (step S1) to determine whether an operation has been performed such that the operation output value is beyond a predetermined region (step S2). This operation means an operation performed such that the operation output value D1 is beyond a continuous region (hereinafter, also referred to as the "output-value-based dead zone") GH (refer to FIG. 6A) including the operation output value D1 corresponding to the fixed keystone correction amount and an area surrounding the output value. The output-value-based dead zone GH is set such that a variation in the operation output value D1 is not beyond the dead zone GH even if variation in the power supply voltage V1, temperature drift, or noise occurs. The output-value-based dead zone GH is set so as to include a variation range of the operation output value D1.

For example, when a variation due to a factor (voltage variation, temperature drift, or noise) other than operation is in the voltage range of −0.2 V to +0.2 V, the dead zone GH is set to a variation range (of −0.2 V to +0.2 V) in which the operation output value D1 is set to the center value (reference).

More specifically, the control unit 30 detects the operation output value D1 as processing in step S1 and determines, as processing in step S2, whether the operation output value D1 is outside the output-value-based dead zone GH. If the value is inside the output-value-based dead zone GH (NO in step S2), the control unit 30 returns the process to step S1 and maintains the current operation mode, i.e., the non-adjustment mode until the operation output value D1 is beyond the output-value-based dead zone GH.

Whereas, if the operation output value D1 is outside the output-value-based dead zone GH (YES in step S2), the control unit 30 starts keystone adjustment (horizontal keystone correction), namely, switches the operation mode to the adjustment mode (step S3).

In the adjustment mode, the control unit 30 changes a horizontal keystone correction amount in accordance with an operation of the keystone operation unit 12 (namely, the operation output value D1) to perform keystone adjustment (keystone correction) (step S4). Then, the control unit 30 finishes the adjustment (correction) (step S5).

Subsequently, the control unit 30 determines whether the keystone operation unit 12 has been operated within a predetermined period, i.e., the set time (two seconds in this countermeasure) TO (step S6). Specifically, the control unit 30 acquires the operation output value D1 of the keystone operation unit 12 at time intervals and determines on the basis of the difference between the previous and following operation output values D1 whether the keystone operation unit 12 has been operated. If the keystone operation unit 12 has been operated (YES in step S6), the control unit 30 returns the process to step S3 to continue the keystone adjustment, namely, the adjustment mode.

FIG. 6B illustrates a case where a horizontal keystone correction amount of −5 degrees is set in the adjustment mode. In the adjustment mode, if the keystone operation unit 12 is operated, the horizontal keystone correction amount is adjusted in accordance with the position of the operation member 12A in steps S3 to S6. For example, when the operation member 12A is positioned in an area corresponding to the central dead zone CH, the horizontal keystone correction amount is set to zero. When the operation member 12A is in the left end, the horizontal keystone correction amount is set to −30 degrees. When the operation member 12A is in the right end, the horizontal keystone correction amount is set to +30 degrees.

Whereas, if the keystone operation unit 12 has not been operated (NO in step S6), the control unit 30 finishes the operation mode switching process. In this case, the fixed keystone correction amount is kept, namely, the operation mode is switched to the non-adjustment mode. At the completion of processing in step S6, the operation mode switching process is restarted from step S1 immediately or in accordance with an interruption signal output at predetermined interruption intervals. Thus, if an operation has been performed such that the operation output value D1 is beyond the predetermined region in the non-adjustment mode (YES in step S2), the operation mode is switched to the adjustment mode, such that keystone correction can be performed.

As described above, if the keystone operation unit 12 has not been operated in the adjustment mode, the operation mode is switched to the non-adjustment mode in which the keystone correction amount is fixed. Even when the operation output value D1 varies due to a factor (variation in the power supply voltage V1, temperature drift, or noise) other than operation, such an event that the keystone correction amount is changed can be avoided. As described above, the countermeasure against the second event beta is provided.

In some cases, the output-value-based dead zone (first dead zone) GH, which is set in the non-adjustment mode, overlaps the central dead zone (second dead zone) CH. In this case, if the operation output value D1 enters the central dead zone CH because of a factor (voltage variation, temperature drift, or noise) other than operation and the keystone correction amount is adjusted to zero, an even in which the keystone correction amount varies due to the factor other than operation.

According to this countermeasure, in order to avoid such an event, when the operation output value D1 is inside the central dead zone CH in the adjustment mode, the keystone correction amount is adjusted to zero. When the operation output value D1 is inside the central dead zone CH in the non-adjustment mode, the control unit 30 fixes the keystone correction amount on the basis of the conversion data 27A without setting the keystone correction amount to zero.

Accordingly, in the case where the operation output value D1 is inside the output-value-based dead zone (first dead zone) GH and is also inside the central dead zone (second dead zone) CH, the keystone correction amount is fixed in the non-adjustment mode. In the adjustment mode, the keystone correction amount is adjusted to zero. Consequently, the event in which the keystone correction amount is adjusted to zero when the operation output value D1 enters the central dead zone CH because of a factor other than operation can be avoided.

Control by the filter 32 will now be described. The filter 32 has a function of calculating a filtering coefficient for pixel interpolation and performing pixel interpolation based on the filtering coefficient under the control of the control unit 30.

FIG. 7 is a flowchart of a control process of the filter 32. The control process is performed when vertical keystone correction is not performed. Referring to FIG. 7, when the operation mode is the adjustment mode (YES in step S11), the control unit 30 determines whether the keystone operation unit 12 has been operated outside the central dead zone CH (step S12). In the non-adjustment mode (NO in step S11), the control unit 30 terminates the process and again performs the process immediately or in accordance with an interruption signal output at predetermined interruption intervals.

When determining in step S12 that an operation has been performed outside the central dead zone CH (YES in step S12), the control unit 30 allows the filter 32 to calculate a filtering coefficient for pixel interpolation in accordance with a horizontal keystone correction amount and perform pixel interpolation (step S13). Thus, pixel interpolation for horizontal keystone correction is performed.

Whereas, if an operation has been performed within the central dead zone CH (NO in step S12), the control unit 30 allows the filter 32 to set a filtering coefficient to zero (step S14). When a filtering coefficient of zero is set, an input of the filter 32 agrees with an output thereof. Accordingly, filtering is not performed. In other words, pixel interpolation is not performed (pixel interpolation is inhibited).

In the present configuration, therefore, when an operation has been performed within the central dead zone CH, pixel interpolation can be inhibited while an image data processing path is not changed. When vertical keystone correction is performed, this process is not carried out and pixel interpolation according to vertical and horizontal keystone corrections is performed. In some cases, pixel interpolation reduces jagged distortions of an image but causes the image to be blurred. In the present configuration, when an operation has been performed within the central dead zone CH, pixel interpolation is inhibited. Accordingly, an input image can be faithfully displayed, thus improving image quality.

As described above, in the present configuration, the control unit 30 sets the central dead zone CH including the zero reference position C, serving as a single point within the operation range of the keystone operation unit 12, and sets the horizontal keystone correction amount to zero in accordance with the operation output value D1 corresponding to the inside of the central dead zone CH. Advantageously, the user can set the horizontal keystone correction amount to zero without relying on an indication of the horizontal keystone correction amount.

The keystone operation unit 12 includes a sliding variable resistor and allows the variable resistor to change the operation output value D1 in accordance with the amount of operation. The control unit 30 sets the horizontal keystone correction amount to zero in accordance with the operation output value D1 within a voltage range corresponding to the central dead zone CH. Advantageously, the horizontal keystone correction amount can be easily set to zero using the variable resistor which is inexpensive. In the use of the variable resistor, the operation output value D1 varies due to individual variations of the resistor, voltage variation, temperature drift, or noise. If the operation output value D1 varies, however, the variation is inside the central dead zone CH. Advantageously, an event in which the horizontal keystone correction amount changes from zero to another value despite user's intention can be avoided.

The keystone operation unit 12 is slidable in the direction orthogonal to the projection direction in which an image is projected by the image projecting unit 24. Since the user operates the keystone operation unit 12 to adjust a horizontal keystone correction amount in the direction orthogonal to the projection direction, the user can adjust the horizontal keystone correction amount intuitively. Furthermore, the user can instinctively recognize the keystone operation unit 12 as an operation unit for horizontal keystone correction. In addition, since the keystone operation unit 12 provides a click state at the zero reference position C, serving as a specific operation position within the central dead zone CH, the click state can be ensured within the central dead zone CH using the mechanical click mechanism. Thus, the user can easily and reliably set the horizontal keystone correction amount to zero without relying on vision.

When the operation output value D1 of the keystone operation unit 12 is inside the central dead zone CH, the filter 32 does not perform pixel interpolation. Accordingly, when an operation is performed within the central dead zone CH, pixel interpolation can be inhibited. An input image can be therefore displayed faithfully, thus improving image quality.

In the present configuration, in the adjustment mode in which the horizontal keystone correction amount is varied in accordance with the operation output value D1 of the keystone operation unit 12, the control unit 30 monitors the operation output value D1 to determine whether the keystone operation unit 12 has not been operated. If the keystone operation unit 12 has not been operated, the control unit 30 switches the operation mode to the non-adjustment mode in which the horizontal keystone correction amount is fixed. Advantageously, an event in which the horizontal keystone correction amount varies due to a factor (voltage variation, temperature drift, or noise) other than a user's operation can be avoided.

Particularly, in the present configuration, the keystone operation unit 12 includes the variable resistor whose output value tends to vary due to voltage variation, temperature drift, or noise. The variation of the variable resistor can be adequately avoided. While the inexpensive variable resistor is used, therefore, the event in which the horizontal keystone correction amount changes due to a factor other than a user's operation can be avoided.

In the present configuration, since keystone correction amount information is not provided to the user, an event in which the user does not notice a change in keystone correction amount caused by a factor other than operation may occur. The present invention can, however, avoid such an event. In other words, the present invention is suitable for a configuration in which keystone correction amount information is not provided to the user.

In the present configuration, in the non-adjustment mode, the control unit 30 sets the output-value-based dead zone (first dead zone) GH including the variation range of the operation output value D1. While the operation output value D1 is inside the output-value-based dead zone GH, the horizontal keystone correction amount is fixed. When the operation output value D1 is outside the output-value-based dead zone GH, the operation mode is switched to the adjustment mode. While an event in which the horizontal keystone correction amount changes due to a factor other than a user's operation is avoided, the horizontal keystone correction amount can be adjusted in accordance with a user's operation, thus improving ease of use.

The output-value-based dead zone GH is set on the basis of the operation output value D1 obtained when the operation mode is switched to the non-adjustment mode. Accordingly, a proper dead zone can be set such that the horizontal keystone correction amount is not changed if the operation output value D1 varies due to a factor other than an operation upon switching.

In the case where the operation output value D1 is inside the output-value-based dead zone GH and is also inside the central dead zone (second dead zone) CH, the control unit 30 fixes the horizontal keystone correction amount in the non-adjustment mode. In the adjustment mode, the control unit 30 sets the horizontal keystone correction amount to zero. While the keystone correction amount can be easily set to zero in the adjustment mode, therefore, an event in which the horizontal keystone correction amount is adjusted to zero if the operation output value D1 enters the central dead zone CH because of a factor other than operation can be prevented.

The above-described embodiment is intended to merely describe an embodiment of the present invention. Any modifications and applications can be made without departing from the spirit of the present invention.

For example, in the above-described embodiment, the present invention is applied to horizontal keystone correction. The present invention can be applied to vertical keystone correction. The present invention can be applied widely to known keystone correction.

In the above-described embodiment, the keystone operation unit 12 includes the sliding variable resistor. The present invention is not limited to the embodiment. The keystone operation unit 12 may include a rotary variable resistor or an operation device other than a variable resistor.

In the above-described embodiment, the keystone operation unit 12 provides a click state when operated to the zero reference position C. The present invention is not limited to the embodiment. The keystone operation unit 12 may provide a click state in a specific operation position other than the zero reference position C.

The above-described functional units, e.g., the image processing unit 21, the keystone correcting unit 22, and the control unit 30 serve as functional components of the projector 10. Concrete forms of them are not especially limited. In other words, hardware corresponding to each functional unit does not always have to be installed. A single processor may perform a program to realize functions of a plurality of functional units.

The above-described projector 10 is of the type in which an image is projected onto the screen SC using the transmissive liquid crystal display panel 24A. A projector with a reflective liquid crystal display panel may be used. Alternatively, a DMD projector with a digital micromirror device may be used. In addition to the 3-chip LCD projector that projects a color image using three light valves, the present invention can be applied to a projector that displays images corresponding RGB using a single liquid crystal light valve in a time-division manner to project a color image, a single-chip DMD projector including a color wheel, and a 3-chip DMD projector. As regards the light source, any of various light sources, such as a xenon lamp, an ultra-high pressure mercury lamp, an LED lamp, may be used. The above-described projector 10 may be of the type which is disposed on the front side of the projection plane and projects projection light to the front surface of the projection plane. Alternatively, the projector 10 may be of the type which is disposed on the rear side of the projection plane and projects projection light to the rear surface of the projection plane. In other words, the present invention can be applied widely to projection display apparatuses having a function of modulating light emitted from a light source.

In the present embodiment, the image signal SA is supplied from the external device 17 to the projector 10. For example, the projector 10 may include a reading device that reads data from an external recording medium, such as an optical disk or a flash memory, and the reading device may read data stored in the recording medium to acquire the image signal SA.

REFERENCE SIGNS LIST

10 Projector (projection display apparatus)
12 Keystone operation unit

12A Operation member
21 Image processing unit
22 Keystone correcting unit (trapezoidal distortion correcting unit)
23 Panel driving unit
24A Liquid crystal display panel
24 Image projecting unit
26 Sensor unit
27 Memory
30 Control unit (correction amount setting unit)
27A Conversion data
31 Coordinate transformer
32 Filter
33 A/D converter
41 Click mechanism
C Zero reference position
D1 Operation output value (output value)
CH Central dead zone (second dead zone)
GH Output-value-based dead zone (first dead zone)

The invention claimed is:

1. A projection display apparatus comprising:
an image projecting unit that projects an image;
an operation unit whose output value changes depending on an amount of manual operation;
a correction amount setting unit that changes a keystone correction amount in accordance with the output value of the operation unit; and
a keystone correcting unit that performs keystone correction on the image to be projected in accordance with the keystone correction amount, wherein
the projection display apparatus operates in two operation modes, one is an adjustment mode in which the keystone correction amount is changed in accordance with the output value of the operation unit and the other is a non-adjustment mode,
in the non-adjustment mode, a first dead zone is set within an operation range of the operation unit, the keystone correction amount is fixed while the output value of the operation unit is within the first dead zone and the operation mode is switched to the adjustment mode when the output value is outside the first dead zone, and
when the operation unit is not operated for a period of time in the adjustment mode, the operation mode is switched to the non-adjustment mode.

2. The apparatus according to claim 1, wherein
the operation unit includes a sliding or rotary variable resistor and allows the variable resistor to change an output voltage in accordance with the manual operation amount, and
the correction amount setting unit sets the keystone correction amount in accordance with the output voltage.

3. The apparatus according to claim 1, wherein
the first dead zone is set based on a first output value obtained when the operation mode is switched to the non-adjustment mode.

4. The apparatus according to claim 1, wherein
a zero reference position in which the keystone correction amount is zero is set within an operation range of the operation unit,
a second dead zone, which includes the zero reference position and an area surrounding the zero reference position is set within the operation range of the operation unit,
when the output value is inside the second dead zone in the adjustment mode, the correction amount setting unit sets the keystone correction amount to zero, and when the output value is inside the second dead zone in the non-adjustment mode, the correction amount setting unit fixes the keystone correction amount.

5. The apparatus according to claim 4, further comprising:
a filter that performs pixel interpolation on the image,
wherein when the output value is inside the second dead zone in the adjustment mode, the filter does not perform pixel interpolation, and when the output value is outside the second dead zone in the adjustment mode, the filter performs pixel interpolation.

6. The apparatus according to claim 1, wherein the projection display apparatus performs keystone correction without providing information regarding the keystone correction amount to a user.

7. A method of projecting an image with keystone correction, comprising:
projecting an image using a projector;
obtaining an output value of an operation unit based on a manual operation amount of the operation unit;
determining whether the projector is in an adjustment mode or a non-adjustment mode;
when it is determined that the projector is in the adjustment mode:
performing keystone correction on the projected image in an amount based on the output value;
when it is determined that the projector is in the non-adjustment mode:
setting a first dead zone within an operation range of the operation unit where a keystone correction amount is fixed while the output value of the operation unit is within the first dead zone; and
switching to the adjustment mode when the output value is outside the first dead zone; and
switching to the non-adjustment mode when the operation unit is not operated for a period of time in the adjustment mode.

* * * * *